(12) United States Patent
Abensur

(10) Patent No.: US 11,299,298 B2
(45) Date of Patent: Apr. 12, 2022

(54) CONNECTION DEVICE WITH SEPARATION CONTROLLED BY NON-PYROTECHNIC THERMAL EFFECT WITH REDUCED REACTION TIME

(71) Applicant: ARIANEGROUP SAS, Paris (FR)

(72) Inventor: Thierry Abensur, Poissy (FR)

(73) Assignee: ARIANEGROUP SAS, Paris (FR)

( * ) Notice: Subject to any disclaimer, the term of this patent is extended or adjusted under 35 U.S.C. 154(b) by 425 days.

(21) Appl. No.: 16/330,583

(22) PCT Filed: Sep. 14, 2017

(86) PCT No.: PCT/FR2017/052457
§ 371 (c)(1),
(2) Date: Mar. 5, 2019

(87) PCT Pub. No.: WO2018/051025
PCT Pub. Date: Mar. 22, 2018

(65) Prior Publication Data
US 2021/0276739 A1    Sep. 9, 2021

(30) Foreign Application Priority Data
Sep. 14, 2016    (FR) ..................... 16 58593

(51) Int. Cl.
*B64G 1/64*        (2006.01)
*B64G 1/42*        (2006.01)

(52) U.S. Cl.
CPC ............ *B64G 1/645* (2013.01); *B64G 1/42* (2013.01)

(58) Field of Classification Search
CPC .......... B64G 1/645; B64G 1/641; B64G 1/64; B64G 1/646; F42B 15/36
See application file for complete search history.

(56) References Cited

U.S. PATENT DOCUMENTS

| | | | |
|---|---|---|---|
| 6,227,493 B1 * | 5/2001 | Holemans | B64G 1/641 244/173.1 |
| 6,479,800 B1 * | 11/2002 | Bueno Ruiz | B64G 1/222 219/200 |

(Continued)

FOREIGN PATENT DOCUMENTS

| | | |
|---|---|---|
| DE | 10 2004 056641 A1 | 2/2006 |
| EP | 1 426 291 A1 | 6/2004 |

(Continued)

OTHER PUBLICATIONS

International Search Report for International Application No. PCT/FR2017/052457 dated Nov. 8, 2017.

(Continued)

*Primary Examiner* — Assres H Woldemaryam
(74) *Attorney, Agent, or Firm* — Pearne & Gordon LLP

(57) ABSTRACT

In order to provide a temporary connection between two structure elements, such as two parts of a space launcher or of another type of spacecraft or aircraft, a connection device with controlled separation comprises a thermally breakable layer, two thermal containment layers, between which the thermally breakable layer is arranged, and an electrically conductive element arranged between the two thermal containment layers in such a way as to heat the thermally breakable layer using the Joule effect when an electric current passes through the electrically conductive element.

8 Claims, 3 Drawing Sheets

(56) References Cited

U.S. PATENT DOCUMENTS

| | | | |
|---|---|---|---|
| 10,329,036 B2* | 6/2019 | Cassanelli | B64G 1/641 |
| 2012/0110823 A1* | 5/2012 | Behar | F42B 15/38 |
| | | | 29/428 |
| 2014/0238794 A1 | 8/2014 | Abensur et al. | |
| 2015/0344157 A1* | 12/2015 | Horie | B64G 1/64 |
| | | | 225/96 |
| 2016/0195378 A1* | 7/2016 | Medina | B64G 1/645 |
| | | | 244/131 |
| 2016/0311562 A1* | 10/2016 | Apland | B64G 1/645 |
| 2017/0284443 A1* | 10/2017 | Von Alberti | B64G 1/62 |

FOREIGN PATENT DOCUMENTS

| | | |
|---|---|---|
| EP | 2 939 934 A1 | 11/2015 |
| JP | H07-27119 A | 1/1995 |
| WO | 2011/080477 A1 | 7/2011 |
| WO | 2015/014943 A1 | 2/2015 |

OTHER PUBLICATIONS

Written Opinion for International Application No. PCT/FR2017/052457 dated Nov. 8, 2017.

Preliminary French Search Report for French Application No. 16 58593 dated Jul. 11, 2017.

Lucy et. al, "Report on Alternative Devices to Pyrotechnics on Spacecraft", 10th Annual AIAA/USU Conference on Small Satellites, 1996, pp. 1-19, NASA Langley Research Center, Hampton, VA, United States of America.

Zhiqiang et. al, "Low Temperature Sn-Rich Au—Sn Wafer-Level Bonding", Journal of Semiconductors, 2013, pp. 106001-1 to 106001-4, vol. 34, No. 10, Institute of Semiconductors, Chinese Academy of Sciences, Beijing, China.

* cited by examiner

CONNECTION DEVICE WITH SEPARATION CONTROLLED BY NON-PYROTECHNIC THERMAL EFFECT WITH REDUCED REACTION TIME

TECHNICAL FIELD

The present invention relates to the field of controlled-separation connection devices used to temporarily connect two structural elements to one another and allow their separation on command.

It can be used in particular in space launch vehicles, for the structural connection between two stages of a space launch vehicle, or the connection of a fairing to the upper structure of a space launch vehicle, or the connection between a payload or an intermediate support structure and the upper structure of a space launch vehicle, or in a satellite, a probe, an aeroplane or any other aircraft, or for any other type of application requiring a controlled-separation connection device, in particular when this device must have a very short reaction time.

STATE OF THE PRIOR ART

In the applications listed above, controllably separable structural bonds are generally achieved by means of pyrotechnic systems. This technology has proven its effectiveness in terms of performance, reliability, and safety.

However, the pyrotechnic shocks inherent in this technique may damage equipment and payloads. Taking this risk into account in the design and use of these systems adds significant costs. Furthermore, the presence of pyrotechnic substances imposes increased safety conditions in the ground assembly phases, which adds further costs.

For these reasons, research has been carried out to design connection devices with separation that can be activated by a non-pyrotechnic thermal effect.

However, devices of this type developed before the present invention, especially those presented in document [1] of the bibliographic list appended at the end of the present description, have revealed insufficient performance for the applications indicated above. In particular, these devices do not make it possible to attain a reaction time of about 20 milliseconds or even less than 20 milliseconds, which is required for such applications.

PRESENTATION OF THE INVENTION

In particular, the invention aims to provide a simple, economical and effective solution to this problem.

To that end, it proposes a controlled-separation connection device comprising a thermally frangible layer, two thermal confinement layers between which the thermally frangible layer is arranged, and an electrically conductive element arranged between the two thermal confinement layers so as to heat the thermally frangible layer by Joule effect when the electrically conductive element carries an electric current.

The invention thus offers a device with separation by non-pyrotechnic thermal effect, which has demonstrated a very short reaction time, for example of about 10 milliseconds in certain embodiments.

Preferably, the thermally frangible layer is a thin layer made of a first material having a melting point lower than a melting point of a second material in which the electrically conductive element is provided.

In this case, the electrically conductive element is advantageously a thin layer of the second material interposed between the thermally frangible layer and one of the two thermal confinement layers.

In addition, the first material is advantageously a metal alloy, preferably a eutectic.

Alternatively, the thermally frangible layer may be composed of a resin loaded with particles that expand under the influence of heat so as to cause said layer to rupture.

In general, the electrically conductive element is preferably in linear or surface contact with the thermally frangible layer.

In addition to a thin layer applied to the thermally frangible layer, the electrically conductive element may alternatively consist of an electrical circuit or cable.

The invention also concerns an assembly of two structural elements temporarily connected by means of a controlled-separation connection device or a set of controlled-separation connection devices of the type described above, one of the two thermal confinement layers of which is attached to one of the two structural elements, while the other thermal confinement layer is attached to the other structural element.

The controlled-separation connection device or the set of controlled-separation connection devices preferably extend(s) around one of the two structural elements and is surrounded by the other structural element.

In certain embodiments of the invention, the two structural elements are two stages of a space launch vehicle, or the two structural elements are respectively the upper part of a space launch vehicle and its fairing, or the upper part of a space launch vehicle and a payload bearing structure, or a payload bearing structure and a payload.

In another embodiment of the invention, the two structural elements are two parts of a fastening screw.

The assembly advantageously comprises an electrical power supply and a controlled means for closing an electrical circuit including the electrical power supply and the electrically conductive element.

BRIEF DESCRIPTION OF THE DRAWINGS

The invention will be better understood, and other details, advantages and characteristics of the invention will become apparent, by reading the following description, which is given by way of example only and with reference to the appended drawings in which.

In all these figures, identical reference numbers may refer to identical or similar elements. In addition, these figures do not reflect the actual proportions.

DETAILED PRESENTATION OF PREFERRED EMBODIMENTS

Figure 1:
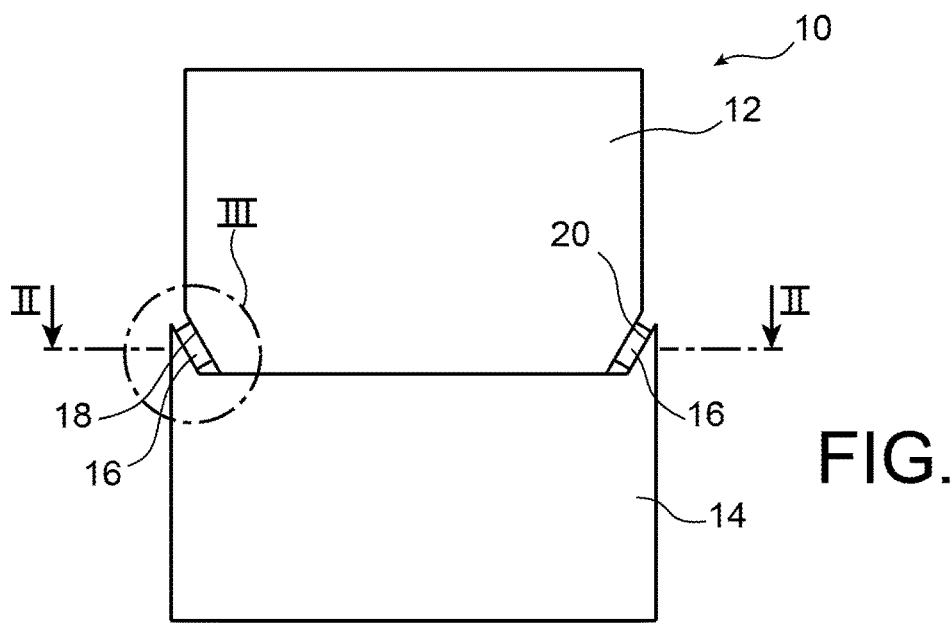
FIG. 1 is a schematic view (axial cross-section) of an assembly of two structural elements according to a first preferred embodiment of the invention, in which the structural elements are two parts of revolution of a space launch vehicle.
Figure 2:
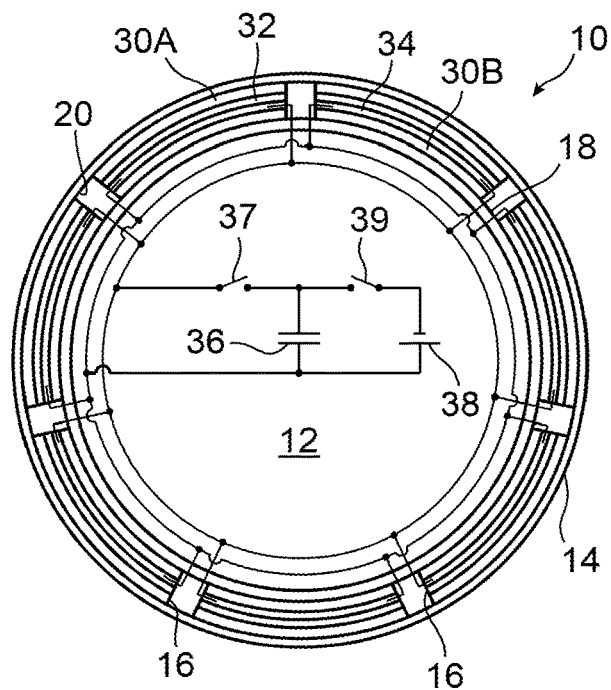
FIG. 2 is a schematic view (cross-section) of the assembly of FIG. 1 on plane II-II of FIG. 1.
Figure 3:
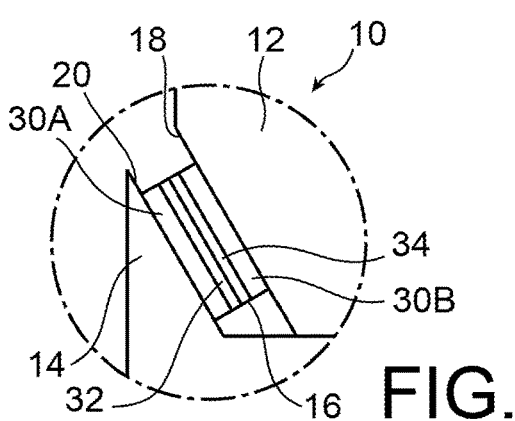
FIG. 3 is an enlarged view of detail III in FIG. 1.

FIGS. 1 to 3 illustrate an assembly 10 of two structural elements 12 and 14 according to a first preferred embodiment of the invention. The two structural elements are for example two upper stages of a space launch vehicle and are temporarily connected to one another by means of a set of controlled-separation connection devices 16.

As a preferential example, the devices 16 provide the interface between two contact surfaces 18, 20 of truncated cone shape belonging respectively to the two structural elements 12 and 14. The truncated cone shape of the contact surfaces 18, 20 facilitates separation of the structural elements 12 and 14, and in particular avoids the risk of jamming during separation. In this case, the devices 16 preferentially take the form of truncated cone sectors, arranged circumferentially one after the other and being spaced apart from one another.

Alternatively, the connection between the structural elements 12 and 14 can be provided by a single truncated cone shaped connection device.

Also alternatively, the devices 16 and the contact surfaces 18, 20 may have the shape of a cylinder of revolution or a portion of a cylinder of revolution, or any other appropriate shape.

As shown in FIGS. 2 and 3, each connection device 16 generally comprises two thermal confinement layers 30A, 30B between which are arranged a thermally frangible layer 32 and an electrically conductive element 34 for heating the thermally frangible layer 32 by Joule effect to cause it to rupture, as will become clearer below.

The electrically conductive elements 34 are preferably supplied by an electrical capacitor 36 (or a set of such capacitors) connected in parallel to the electrically conductive elements 34 via a controlled switch 37, and capable of being electrically charged on command by means of a power supply 38. To that end, the latter is for example also connected to the capacitor via another controlled switch 39.

The electrical capacitor 36 can thus be charged in flight. This is done by closing the controlled switch that connects it to the power supply 38. Thus, during pre-flight ground operations, the electrical capacitor 36 can remain discharged to avoid any risk of unintentional triggering of the separation process.

In the terminology of the present invention, the electrical capacitor 36 thus forms an electrical power supply, while the controlled switch 37 forms controlled means for closing an electrical circuit including the electrical power supply and the electrically conductive element 34 of each connection device 16.

In certain embodiments of the invention, the thermally frangible layer 32 is a thin layer made of a first material having a relatively low melting point, while the electrically conductive element 34 is a thin layer of a second material having a melting point higher than the melting point of the first material.

The term "thin film" is to be understood according to its commonly accepted definition, namely a layer whose thickness varies from a fraction of a nanometre to a few micrometres.

In the example shown, the first material is a eutectic alloy of gold (Au) and tin (Sn), the melting point of which is about 300 degrees Celsius, while the second material is pure gold, the melting point of which is above 1000 degrees Celsius.

Figure 4:
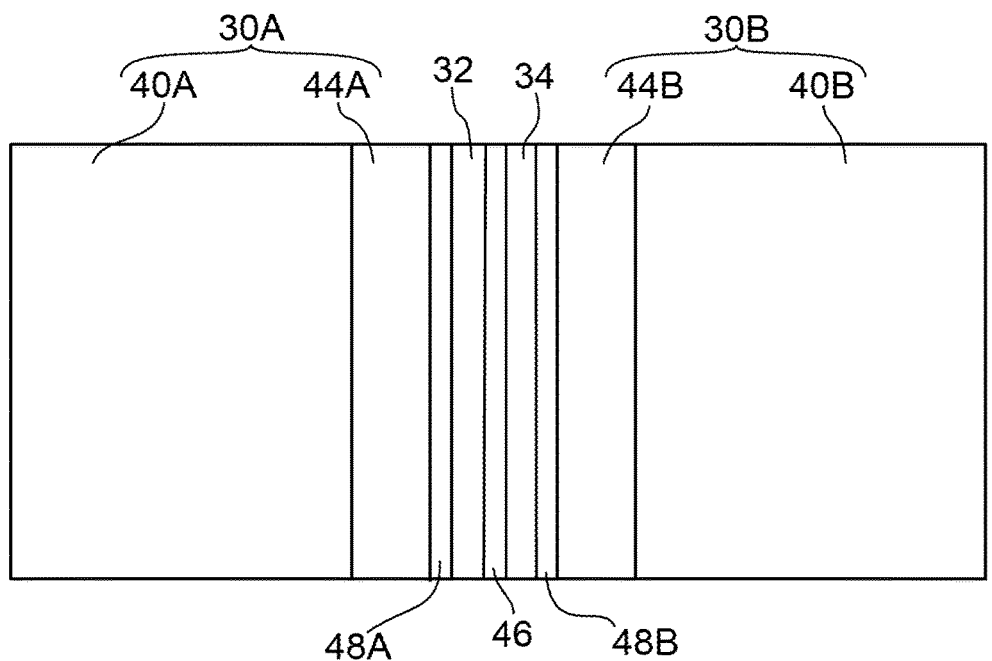
FIG. 4 is a cross-sectional view of a controlled-separation connection device that connects the structural elements of the assembly in FIG. 1 to one another.

FIG. 4 shows more precisely the structure of a controlled-separation connection device 16 in an example embodiment of the invention.

In this example, each of the thermal confinement layers 30A, 30B is composed of two sub-layers, namely a metal sub-layer 40A, 40B, for example a few millimetres thick and made of an aluminium alloy, forming an outer face of the device, and a sub-layer 44A, 44B of a thermally and electrically insulating ceramic, such as yttrium-stabilized zirconia (YSZ), the thickness of which is between about 100 and 200 micrometres. The two thermal confinement layers 30A, 30B preferably have structures symmetrical to each other.

In addition, the thermally frangible layer 32 and the thin layer forming the electrically conductive element 34 are separated from each other by a first thin layer forming a diffusion barrier 46, for example made of chromium (Cr), about 50 nanometres thick. Similarly, the thermally frangible layer 32 and the thin layer forming the electrically conductive element 34 are separated from the thermal confinement layers 30A and 30B respectively by second and third thin layers forming diffusion barriers 48A, 48B similar to the first thin layer 46. The thin layers 46, 48A, 48B also improve bonding between the other layers forming the device.

Figure 5:
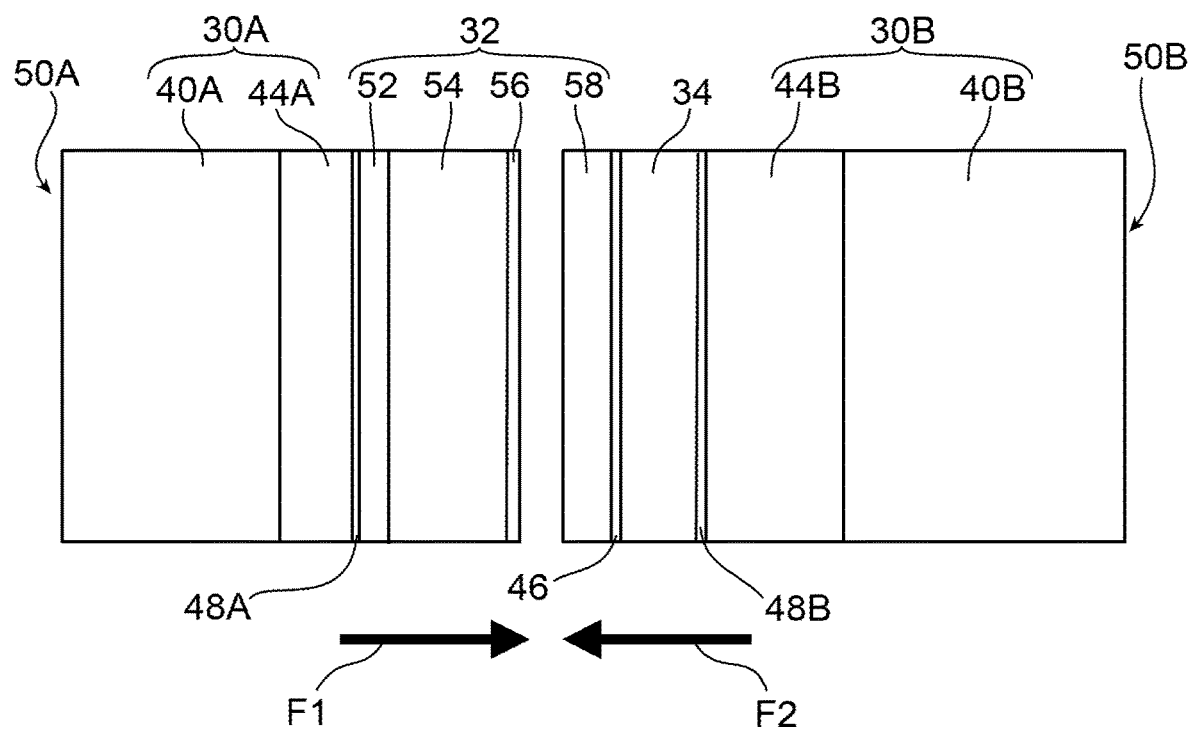
FIG. 5 illustrates a step of a process for manufacturing the controlled-separation connection device in FIG. 4.

By way of example, the controlled-separation connection device 16 described above can be obtained by a process comprising the steps of producing a first composite structure 50A (FIG. 5), producing a second composite structure 50B (FIG. 5), and then assembling the two structures 50A and 50B to obtain the device 16 (FIG. 4).

More precisely, the step of forming the first composite structure 50A includes the sub-steps consisting in:

forming the sub-layer 44A of thermally and electrically insulating ceramic on the metal sub-layer 40A (FIG. 5), for example by electrophoretic deposition (EPD); then forming the second thin layer forming a diffusion barrier 48A on the previous sub-layer 44A, for example by physical vapour deposition (PVD); then forming successively, on the previous layer 48A, a thin layer of gold 52, about 150 nanometres thick, then a thin layer of tin 54, about 1.55 micrometres thick, then a thin layer of gold 56, about 50 nanometres thick.

The step of forming the second composite structure 50B includes the sub-steps consisting in:

forming the sub-layer 44B of thermally and electrically insulating ceramic on the metal sub-layer 40B, for example by EPD; then forming the third thin layer forming a diffusion barrier 48B on the previous sub-layer 44B, for example by PVD; then successively forming, on the previous layer 48B, the thin layer forming the electrically conductive element 34, about 1 micrometre thick, then the first thin layer forming a diffusion barrier 46, then a thin layer of gold 58, about 300 nanometres thick.

In this case, the step of assembling the two composite structures 50A and 50B is performed by thermocompression: the two structures are placed side by side so as to apply the gold layer 58 of the second structure to the gold layer 56 of the first structure, then a pressure of about 7 MPa is applied for about 60 minutes at a temperature of about 310 degrees Celsius, as shown by arrows F1 and F2 (FIG. 5), according to the method described in document [2] in the bibliographic list appended at the end of the present description. This method makes it possible to transform the sandwich comprising the layers 52, 54, 56, 58 into a homogeneous alloy comprising 54% tin and 46% gold (in weight percent), in which the main chemical species is AuSn2. This homogeneous alloy forms the thermally frangible layer 32. The latter is thus notably able to resist a shear stress of 64 MPa, and therefore to withstand the stress levels encountered in the applications mentioned above.

The attachment of each controlled-separation connection device 16 to the structural elements 12 and 14 can be carried out in a conventional manner and will not be described in detail here. By way of illustration, this attachment can for example be carried out by bolting each of the metal sub-layers 40A, 40B to the corresponding structural element 14, 12.

During operation, separation of the structural elements 12 and 14 is triggered by causing an electrical current to circulate within the electrically conductive element 34 of each controlled-separation connection device 16. In the example shown, it is therefore a matter of closing the controlled switch 37 so that the electrical capacitor 36, previously charged, generates an electrical current within each electrically conductive element 34, which heats by Joule effect. The heat generated propagates by thermal conduction within the adjacent thermally frangible layer 32, while being confined between the two corresponding thermal confinement layers 30A, 30B. In the example shown, since the thermally frangible layer 32 is made of an electrically conductive material, the electrical current also propagates in the thermally frangible layer 32 by electrical conduction and causes an additional heating of the latter by Joule effect.

In all cases, the temperature of the thermally frangible layer 32 increases very rapidly beyond the melting temperature of the first material constituting said layer, causing the thermally frangible layer 32 to rupture. The integrity of the electrically conductive element 34 is maintained because the melting temperature of the second material of which it consists is higher than that of the first material. In the example shown, the difference between the respective melting temperatures of the first and second materials is thus greater than 700 degrees Celsius.

The rupturing of the thermally frangible layer 32 causes the separation of the two structural elements 12 and 14. In the example shown, this separation is effective within 10 milliseconds from the separation command, under nominal operating conditions, typically at a temperature between −40 degrees Celsius and 70 degrees Celsius, and at a pressure between 0 bar and 1 bar.

Of course, other configurations of the device 16 are possible in the context of the present invention.

Thus, the thermal confinement layers 30A, 30B can each be composed of an electrically and thermally insulating structural ceramic material, for example the material marketed by Corning Inc. under the name MACOR (trademark), instead of the stack of sub-layers described above.

In addition, the thermally frangible layer 32 can be made of a metal alloy other than the one described above, or of another type of material.

Figure 6:
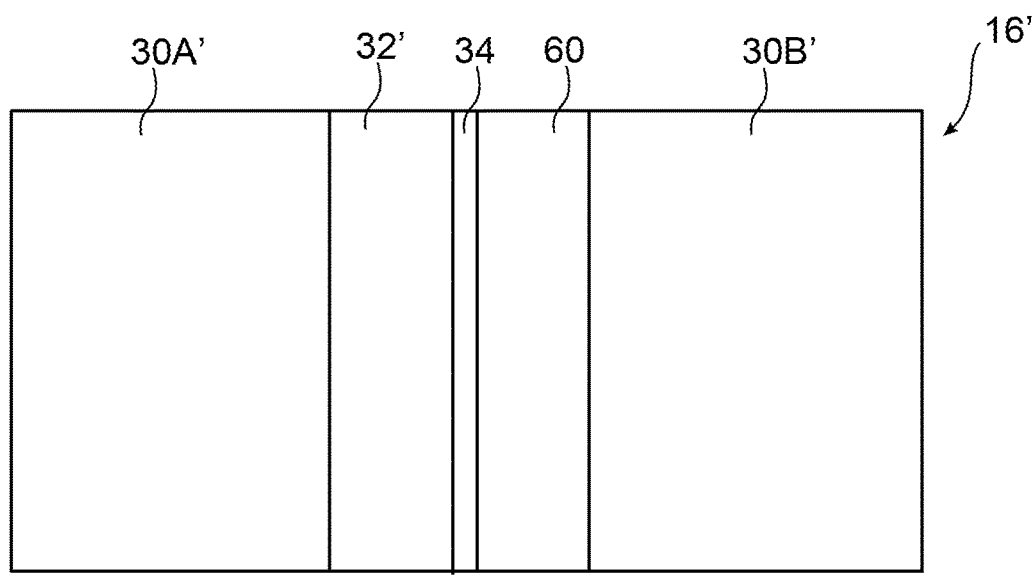
FIG. 6 is a view similar to FIG. 4, of a variant embodiment of the controlled-separation connection device.

FIG. 6 thus describes a variant embodiment of a controlled-separation connection device 16', in which the thermally frangible layer 32' is made of an adhesive resin loaded with particles that expand under the influence of heat so as to cause the thermally frangible layer 32' to rupture. Such a resin is known, for example, from document [3] in the bibliographic list below.

In the example shown in FIG. 6, the device 16' thus comprises a thermal confinement layer 30A' a few millimetres thick, the thermally frangible 32' layer of loaded epoxy resin, having a thickness of about 100 micrometres, the thin layer forming the electrically conductive element 34 similar to that described above, a conventional epoxy adhesive layer 60' having a thickness of about 100 micrometres, then the other thermal confinement layer 30B' similar to the thermal confinement layer 30A'.

In another variant, the electrically conductive element 34 may be in a different form from the layer described above, for example in the form of an electrical circuit or cable, embedded in a layer of thermally conductive material arranged in contact with the thermally frangible layer 32 or 32', or embedded directly in the thermally frangible layer 32 or 32'.

In general, it is preferable that the electrically conductive element 34 be distinct from the thermally frangible layer 32, 32' so that the electrically conductive element continues to operate optimally at least until the thermally frangible layer has completely broken.

However, in certain embodiments of the invention, the electrically conductive element 34 may consist of the thermally frangible layer itself, provided that the latter consists of an electrically conductive material.

Figure 7:
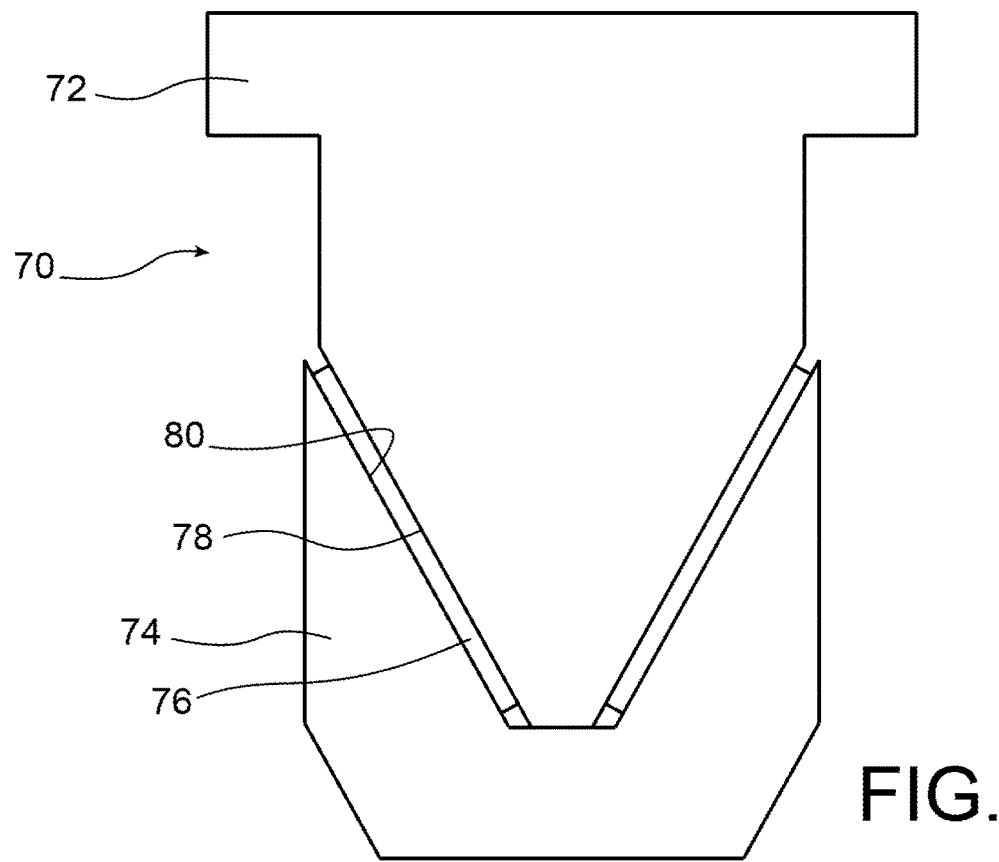
FIG. 7 is a schematic view (axial cross-section) of an assembly of two structural elements according to a second preferred embodiment of the invention, in which the structural elements form a fastening screw.

FIG. 7 shows an assembly 70 of two structural elements 72 and 74 temporarily connected by means of a controlled-separation connection device 76 of the type described above, the assembly forming, according to a second preferred embodiment of the invention, a fastening screw. One of the structural elements 72 thus forms the head and part of the shank of the fastening screw while the other structural element 74 forms the rest of the shank.

The two structural elements 72, 74 have respective contact surfaces 78, 80 of truncated cone shape between which is interposed the controlled-separation connection device 76, which is for example also of truncated cone shape. The device 76 thus extends around an end portion of the structural element 72. Of course, the device 76 incorporates electrical connection means (not shown in the figure) to allow an electrical current to pass through the electrically conductive element of the device, in a manner similar to that described above.

The manufacture and operation of the assembly 70 are similar to the manufacture and the operation of the assembly 10 described above.

BIBLIOGRAPHY

[1]: M. H. Lucy et al., 'Report on Alternative Devices to Pyrotechnics on Spacecraft', 10th annual AIAA/USU Conference on Small Satellites, Utah State University, Logan, Utah 84341-1942, September 1996

[2]: Fang Zhiqiang, 'Low temperature Sn-rich Au—Sn wafer-level bonding', Journal of Semiconductors, Vol. 34, No. 10, October 2013

[3]: Marie-Pierre Foulc, 'Assembly of two substrates bonded by a rigid polymer, and methods for assembly and dismantling, by means of migration of said bonded assembly', WO 2011/080477 A1

What is claimed is:

1. A controlled-separation connection device, comprising a thermally frangible layer, two thermal confinement layers between which the thermally frangible layer is arranged, and an electrically conductive element arranged between the two thermal confinement layers so as to heat the thermally frangible layer by Joule effect when the electrically conductive element carries an electric current,
wherein the thermally frangible layer is a thin layer made of a first material having a melting point lower than a melting point of a second material in which the electrically conductive element is provided, and
wherein the first material is a metal alloy.

2. The controlled-separation connection device according to claim 1, wherein the electrically conductive element is a thin layer of the second material interposed between the thermally frangible layer and one of the two thermal confinement layers.

3. The controlled-separation connection device according to claim 1, wherein the electrically conductive element is in linear or surface contact with the thermally frangible layer.

4. An assembly of two structural elements temporarily connected by means of a controlled-separation connection device or a set of controlled-separation connection devices according to claim 1, one of the two thermal confinement layers of which is attached to one of the two structural elements, while the other thermal confinement layer is attached to the other structural element.

5. The assembly according to claim 4, wherein the controlled-separation connection device or the set of controlled-separation connection devices extends around one of the two structural elements and is surrounded by the other structural element.

6. The assembly according to claim 4, wherein the two structural elements are two stages of a space launch vehicle, or the two structural elements are respectively an upper part of a space launch vehicle and a fairing of the space launch vehicle, or the upper part of a space launch vehicle and a payload bearing structure, or a payload bearing structure and a payload.

7. The assembly according to claim 4, wherein the two structural elements are two parts of a fastening screw.

8. The assembly according to claim 4, comprising an electrical power supply and controlled means for closing an electrical circuit including the electrical power supply and the electrically conductive element or each controlled-separation connection device.

* * * * *